Robert Alston Brockbank
Eric Fifield Stuart Clarke
INVENTORS

BY Hall & Houghton
ATTORNEYS

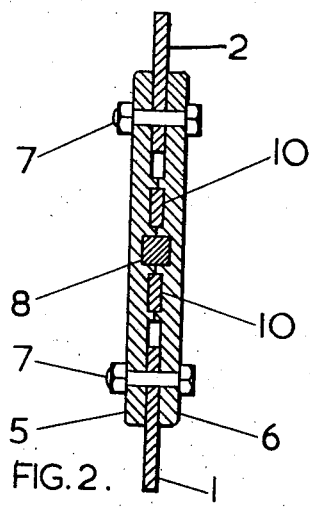
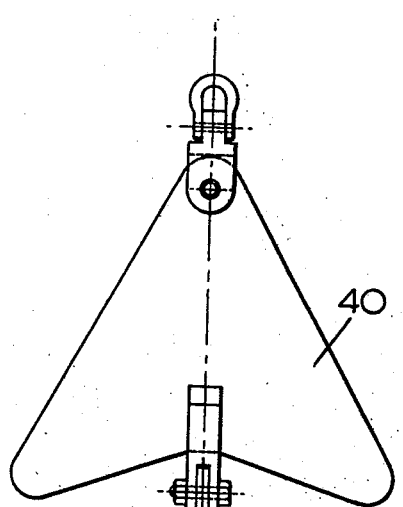
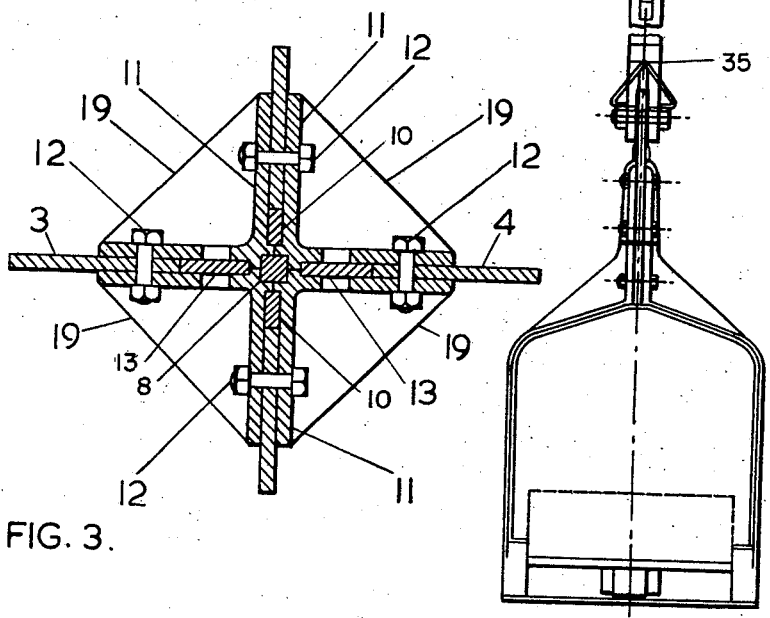
FIG. 2.
FIG. 3.
FIG. 5.
ROBERT ALSTON BROCKBANK
ERIC FIFIELD STUART CLARKE
INVENTORS
BY Hall & Houghton
ATTORNEYS

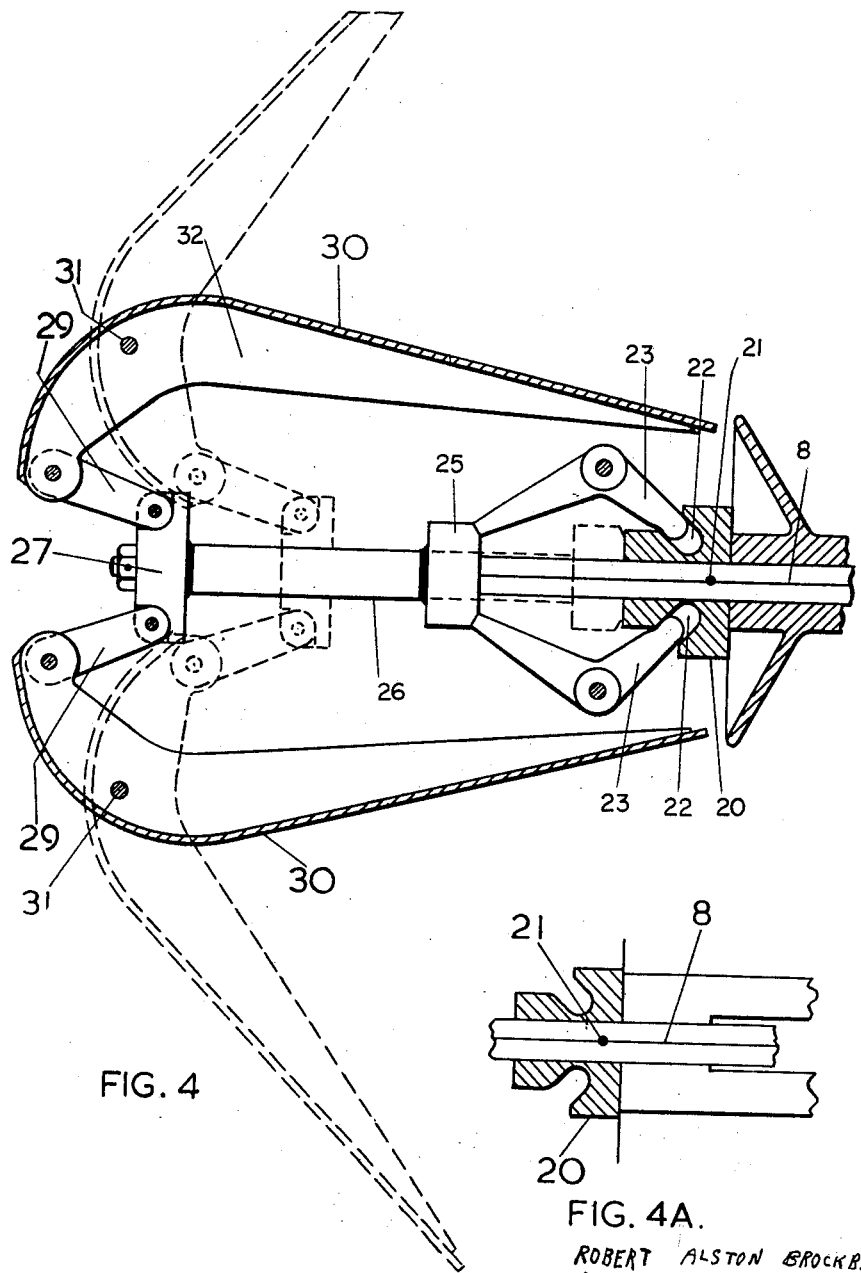

United States Patent Office 3,129,030
Patented Apr. 14, 1964

3,129,030
GRAPNELS FOR SUBMARINE CABLES
Robert Alston Brockbank and Eric Fifield Stuart Clarke, Kenton, Harrow, England, assignors to Her Majesty's Postmaster General, London, England
Filed Apr. 10, 1962, Ser. No. 186,388
13 Claims. (Cl. 294—66)

This invention relates to grapnels for use in locating submarine cables and has particular although not exclusive reference to grapnels for locating submarine communication cables.

When a cable ship is attempting to locate a submarine cable by means of a grapnel which is dragged across the expected path of the cable, a change in tension of the hawser to which the grapnel is coupled is used to provide an indication that the grapnel has engaged the cable.

The indication obtained is however not reliable as it is not aways possible to distinguish between changes in tension of the grapnel hawser resulting from irregularities in the sea bottom or other obstacles encountered by the grapnel, and changes resulting from engagement of the grapnel with the cable.

It is important that a reliable indication of the engagement should be available on board as soon as possible after engagement has taken place in order that the ship be brought to a standstill quickly to reduce to a minimum the possibility of damage to the cable by dragging it along the sea bottom.

An early reliable indication therefore results in a considerable saving both in time and cost.

In the past, submarine communication cables have been protected with external armouring but even with that construction, cables have suffered damage because it has not been possible to obtain a prompt and reliable indication of the instant of engagement of the cable by a grapnel.

The difficulty is even more pronounced in the case of the so-called lightweight cable, for example, submarine cables of the construction described in British patent specification No. 703,782, and in which the external armouring is replaced by a high tensile strength steel wire core. The lightweight cable is much lighter in weight than a corresponding armoured cable and much more prone to damage since there is no external metallic protection.

It is an object of the present invention to provide a grapnel having means whereby a clearer indication of cable engagement can be obtained than hitherto.

According to the present invention a submarine cable grapnel comprises a framework with at least two prongs, cable engaging surfaces associated with the prongs and movable relatively to the framework, sea bed engaging means normally in an inoperative position, and a linkage between the latter and the cable engaging surfaces such that, in use, on the application of a predetermined pressure to the surfaces, the means are released to move to an operative, sea bed engaging position.

Preferably, displaceable catches are fitted adjacent the cable engaging surfaces to trap the cable.

The cable engaging surfaces may comprise cable cutting blades.

In one embodiment of the invention, the sea bed engaging means comprises flukes pivotally mounted upon the framework. The grapnel may include a central operating rod linked to the flukes in such manner that longitudinal movement of the rod relative to the framework causes pivotal movement of the flukes between an inoperative position and an operative or sea bed engaging position.

The cutting blades may rest upon a collar loosely mounted upon the central operating rod but secured thereto by a mechanical device releasable by the predetermined pressure, for example a shear pin. Relative movement of the rod may initially be prevented by means of bell crank levers engaged between the collar and a block fixed to the rod.

In a particular embodiment of the invention, the grapnel includes four prongs arranged to extend normally from the central operating rod. The prongs are disposed in diametrically opposite pairs of which one pair is at one level relative to the rod and the other pair at a different level. Alternatively, only one pair of prongs is provided and the grapnel is fitted with a planing board arranged so that one or other of the prongs is always in contact with the sea bed when the grapnel is in use.

The sea bed engaging means may be separate from the framework and joined to the latter by the linkage which may include a chain or hawser. In such an embodiment, the sea bed engaging means includes flukes permanently in a sea bed engaging position but the means is so disposed relative to the framework that normally the flukes are inoperative.

By way of example only, embodiments of the invention suitable for use with deep sea communication cables will now be described in greater detail with reference to the accompanying drawings of which:

FIGS. 2 and 3 are sections respectively on the lines II—II and III—III of FIG. 1, FIG. 4 is a simplified section of part of the embodiment of FIG. 1, FIG. 4A is a scrap view of a detail of the embodiment of FIG. 1, FIG. 5 is a front elevation of a second embodiment, and, FIG. 6 is a side elevation of the lower part only of the embodiment of FIG. 5.

Figure 1:
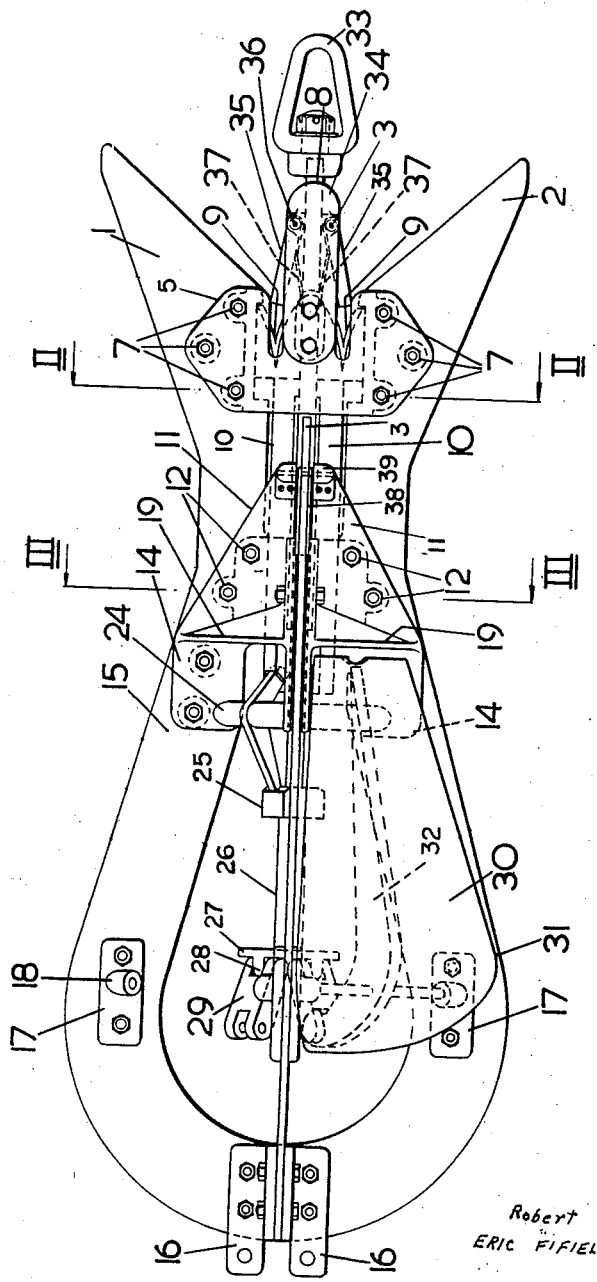
FIG. 1 is an elevation of a first embodiment.

Referring first to FIGS. 1–4A, the grapnel comprises two main prong members 1, 2 and two subsidiary prong members 3, 4. The main prong members are disposed at right angles to the subsidiary members, the latter being also shorter in overall length than the former and have their right hand extremities positioned somewhat to the left of those of the main members (as seen in FIG. 1).

The main prong members are secured together at their left-hand ends (as seen in FIGS. 1 and 2) by a pair of fish plates 5, 6 formed internally to provide, when bolted together by bolts 7, passageways for a central operating rod 8 and cutting blades 9 each of which has a longitudinal extension in the form of a separate push rod 10. The cutting blades have curved edges as shown to ensure an efficient cutting action.

The prong members 1, 2 are held together and to the prong members 3, 4 by four brackets 11 and bolts 12. As can be seen from FIG. 3, the adjacent faces of the brackets 11 are formed to accommodate the operating rod 8, the push rods 10 of the cutting blades 9, and two other cutting blades 13. The other cutting blades 13 have a cutting edge shape similar to that of the cutting blades 9. Thus the prong members extend normally from the central operating rod 8 and are arranged in pairs with their extremities at different points along the rod.

As can be seen from FIG. 1, each bracket 11 has an extension 14 also bolted to a portion 15 of the framework. The portions 15 shaped as shown are bolted together by brackets 16. Brackets 17 each with a socket 18 are also bolted to the portions 15. The brackets 11 also have cross webs 19.

The ends of the push rods 10 of the cutting blades 9 and the ends of the other cutting blades 13 rest on a two-piece collar 20 loosely mounted upon the central operating rod 8 but normally pinned thereto by a shear pin 21. The left hand face (as seen in FIGS. 4 and 4A) of the collar 20 has two diametrically opposite recesses 22 in which are received the rounded ends of bell crank levers 23 pivotally mounted on axles carried by sockets 24 on opposite faces of the extensions 14 of two of the brackets 11. The other ends of the levers 23 rest upon bevelled faces formed in a block 25 fixed to one end of a tube 26 surrounding the left-hand end of the central operating rod 8. The other end of the tube 26 carries a mounting plate 27 and is fixed to the central operating rod 8. The underneath face of the plate 27 is machined to provide brackets 28 which provide pivotal mountings for H shaped levers 29 also pivotally joined to the incurved ends of flukes 30 supported on axles 31 mounted between pairs of sockets 18.

As can be seen in FIG. 4, each fluke is approximately petal shaped with an inturned end and a central strengthening rib 32 by which the fluke is mounted upon the axle 31 and to which the H shaped lever 29 is pivotally attached. The other ends of the flukes are (in the position shown in FIG. 1) concealed by the webs 19 of the brackets 11.

To the end of the central operating rod 8 is fixed a shackle 33 by which the grapnel is coupled to a steel hawser.

Elongated plates 34 bolted to fish plates 5 and 6 house part of two catches 35 pivoted at 36 between the plates 34 and spring urged into the outward position w shown in FIG. 1 by leaf springs 37. In the outward positions shown, the ends of the catches close the mouths of the cutting blades 9. Inward movement of the catches against the springs 37 which takes place as described later exposes the mouths of the cutting blades.

In addition, similar catches 38 are fitted adjacent cutting blades 13, those catches being pivoted between brackets of which two, 39, are visible in FIG. 1.

In use, the grapnel is lowered from a cable ship into the sea at a suitable point in the vicinity of the submarine cable which is to be recovered and then dragged by the ship along the sea bottom across the line of the cable. Normally, one or other of the upper prongs 1, 2 will scrape along the sea bed until the cable is encountered. The cable then slides down the inner face of the prong on to the associated cutting blade 9 so displacing to its inner position the associated catch 35 which subsequently restores and so traps cable for engagement with the cutting blade. A gradually increasing resistance to the movement of the grapnel forces the cable between the edges of the cutting blade thereby exerting a pressure on the latter which is transmitted via the push rods 10 and the collar 20 to pin 21 which ultimately shears thereby permitting movement of the collar 20 along the rod 8 towards the plate 27. The levers 23 are swung out of contact with the block 25 thereby releasing the central operating rod which moves to the right (as seen in FIG. 1) and the flukes are forced outwardly. That position is indicated in dotted lines in FIG. 4.

At least one of the extended flukes will be forced into the sea bottom thereby increasing substantially the resistance to movement of the grapnel and the tension in the hawser supporting the latter. Such increase in tension can easily be detected by suitable instruments in the cable ship and a positive indication is thereby obtained that the cable is "hooked." The ship then steams to a position vertically above the grapnel thereby releasing the flukes from the sea bottom. Thereafter, a vertical lifting of the grapnel from the sea bottom increases the cable tension and so severs the cable. The grapnel is then drawn to the surface and replaced by a different form of grapnel which, after locating the cable, holds it and thereby permits it to be drawn to the surface.

If the grapnel so positions itself on the sea bottom that the cable engages either subsidiary prong 3 or 4, holding and cutting are effected in the same way.

Alternatively however, the grapnel shown in the drawings may be provided with clamps which enable a predetermined end of the cable to be held after the cable is severed and to be drawn to the surface with the grapnel.

Again, each of the cutting blades may be replaced by a smooth non-cutting member with a cable engaging surface so disposed relative to the fish plates 5, 6 that when the shear pin is sheared, the member is depressed by the cable to a position in which the fish plate takes the full weight of the cable. The area of engagement between the fish plate and the cable and the contour thereof may be such as to ensure that the cable is lifted in a bight without damage.

In a further alternative, the blades may be replaced by pulleys which have the effect of equalizing tension in the cable on each side of the bight during recovery.

It will be appreciated that one or other of the prongs should engage a cable lying on the sea bed regardless of the position of the grapnel as it is dragged along the sea bed.

In the circumstances, where the sea bottom is rocky, very broken or undulating, it may be necessary to shackle a second grapnel to the rear end of the first to increase the chances of hooking the cable. The brackets 16 have extensions to permit that and further grapnels can be secured in series if necessary.

Figure 6:
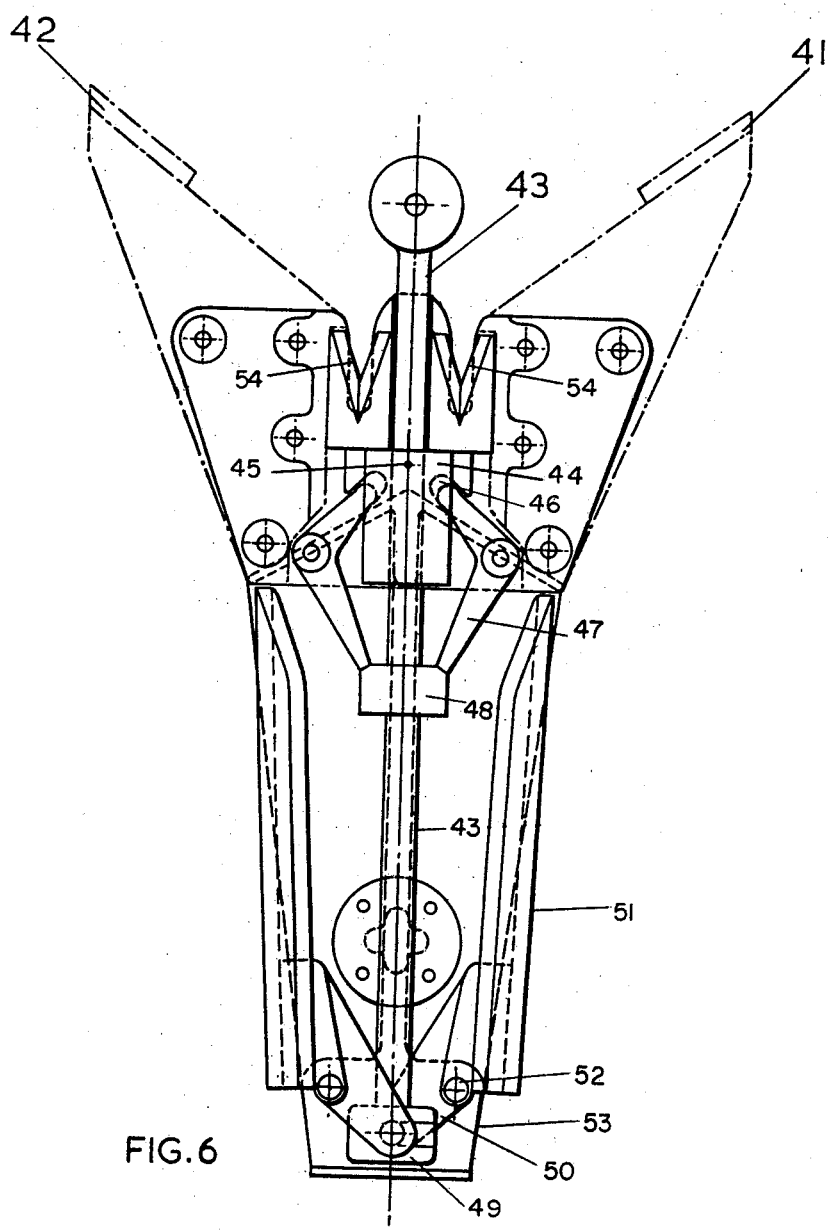

In a second embodiment of the invention illustrated in FIGS. 5 and 6, the orientation of the grapnel is determined by a planing board 40 which, in operation, always lies flat on the sea bottom and it is therefore possible to construct the grapnel with only two prongs which are numbered 41 and 42.

The embodiment of FIGS. 5 and 6 is generally similar to that of FIGS. 1–4A there being a central operating rod 43 with a collar 44 connected thereto by a mechanical shear pin 45. The collar 44 is recessed at 46 to receive one rounded end of each of two bell crank levers 47 whose other ends rest on bevelled faces machined in a block 48 fixed to the rod 43. The lower end (as seen in the drawings) of rod 43 has a mounting plate 49 fixed to it and to which are pivoted levers 50 secured to the flukes 51 which are pivoted at 52 to members 53 forming part of the framework of the grapnel.

As before, each prong has associaetd movable cutting blades 54 whose lower faces rest on the collar 44.

The embodiment of FIGS. 5 and 6 operates in a similar manner to that of FIGS. 1–4A. Due to the presence of the planing board, one or other of the prongs 41, 42 will be in contact with the sea bottom and will engage the cable. When the pin 45 shears, levers 47 are moved out of contact with the block 48 and the central operating rod 43 then moves rapidly upwardly (as viewed in the drawings) and the flukes swing outwardly and one of them digs into the sea bed resulting in a substantial increase of tension in the hawser supporting the grapnel. Thereafter the cable is severed as before.

In a further embodiment, the grapnel is in two parts linked together by a wire hawser or chain. A first part comprises the prongs, cutting blades and collar with shear pin whilst the second part includes a shaft carrying flukes permanently secured in an open or operative position. The parts are coupled together so that, initially, the flukes are trailing with their open ends pointing rearwardly. When a cable is hooked and the pin is sheared, the second part swings round on movement of the grapnel into a reverse position in which the flukes can dig into the sea bottom. The linkage between the parts might consist of a coupling between the first part and the normally rear part of the second part and a connection between the first part and the normally front end of the second part comprising a length of hawser or chain. The coupling is controlled by the shear pin so that when the latter shears the coupling is broken and the only connection between the parts then exisitng is via the length of hawser. As the grapnel continues to move along the sea bottom the second part is pulled round into a reverse position in which the open ends of the flukes face forwardly.

Further, both the second and further embodiments may be provided with means for retaining one end of a severed cable.

We claim:

1. A submarine cable grapnel comprising in combination a framework, at least two outwardly extending cable prongs fixedly mounted on said framework, cable cutters movably mounted on said framework adjacent the roots of said prongs, a plurality of sea-bed engaging fluke-like members pivotally mounted on said framework and movable between a retracted position close to said framework and a position in which said fluke-like members are extended from said framework, trigger means for locking said fluke-like members in retracted position, and operating means interconnecting said cable-cutters and said trigger means, said operating means unlocking said trigger means in response to movement of said cable cutters by a submarine cable engaged thereby for permitting movement of said fluke-like members to a sea-bed engaging position.

2. A submarine cable grapnel comprising in combination a framework, at least two outwardly extending cable prongs fixedly mounted on said framework, cable cutters movably mounted upon said framework adjacent the roots of said prongs, a shaft mounted in said framework for longitudinal movement with respect to the latter, trigger means mounted on said framework for locking said shaft against movement, a plurality of sea-bed engaging fluke-like members pivotally mounted on said framework and movable between a retracted position close to said framework and positions in which said members are extended from said framework, levers interconnecting each of said members with said shaft so that on longitudinal movement of the latter movement of said members from one position to the other is effected, and operating means interconnecting said cable cutters and said trigger, said operating means unlocking said trigger means in response to movement of said cable cutters by a submarine cable engaged thereby for permitting movement of said fluke-like members to a sea-bed engaging position.

3. A submarine cable grapnel comprising in combination a framework, at least two outwardly extending cable prongs fixedly mounted on said framework, cable cutters movably mounted upon said framework adjacent the roots of said prongs, a shaft mounted in said framework for longitudinal movement with respect to the latter, an abutment on said shaft, a collar mounted on said shaft, a shear pin interconnecting said collar with said shaft, a series of levers pivotally mounted upon said framework and each in engagement with said abutment and said collar, said cable cutters resting on said collar, a plurality of sea-bed engaging fluke-like members pivotally mounted on said framework and each movable between a retracted position close to said framework and positions in which said members are extended from said framework, and a linkage interconnecting said members with said shaft so that on longitudinal movement of the latter movement of said members from one position to the other is effected.

4. A submarine cable grapnel comprising in combination a framework, at least two outwardly extending cable prongs fixedly mounted on said framework, cable cutters movably mounted on said framework adjacent the roots of said prongs, displaceable cable catches mounted on said framework adjacent said cable cutters to trap a cable after engagement with one of said cutters, a plurality of sea-bed engaging fluke-like members pivotally mounted on said framework and movable between a retracted position close to said framework and a position in which said fluke-like members are extended from said framework, trigger means for locking said fluke-like members in retracted position, and operating means interconnecting said cable-cutters and said trigger means, said operating means unlocking said trigger means in response to movement of said cable cutters by a submarine cable engaged thereby for permitting movement of said fluke-like members to a sea-bed engaging position.

5. A submarine cable grapnel comprising in combination a framework, at least two outwardly extending cable prongs fixedly mounted on said framework, cable cutters movably mounted upon said framework adjacent the roots of said prongs, a shaft mounted in said framework for longitudinal movement with respect to the latter, an abutment on said shaft, a series of levers pivotally mounted upon said framework and each in engagement with said abutment, and operating means for holding said levers in engagement with said abutment, said operating means being responsive to movement of any one of said cable cutters for releasing said levers from engagement with said abutment.

6. A submarine cable grapnel as claimed in claim 1 and in which said operating means includes a shear pin the shearing movement of which is effected on predetermined movement of said cutter blades.

7. A submarine cable grapnel as claimed in claim 1 and having four cable prongs disposed in two pairs spaced along said framework, the prongs of each pair being in line with one another and the prongs of one pair being disposed at right angles to the prongs of the other pair.

8. A submarine cable grapnel comprising a framework with at least two prongs, cable engaging means movable relatively to the framework, sea-bed engaging flukes pivotally mounted upon the framework and normally in an inoperative position, and a linkage between said sea-bed engaging flukes and said cable engaging means, said linkage comprising a longitudinal rod carrying securing means by which the grapnel, in use, is secured by a supporting hawser, said rod being held against movement by pivotally mounted levers, one end of each of which is in engagement with an abutment on the rod, the other ends of the levers being held by a member movable with respect to the rod but normally held against such movement by a mechanical device releasable on application of a predetermined pressure on the cable engaging means to permit movement of the flukes to a sea-bed engaging position.

9. A submarine cable grapnel comprising in combination a framework, at least two outwardly extending cable prongs fixedly mounted on said framework, cable engaging means movably mounted on said framework adjacent the roots of said prongs, a plurality of sea-bed engaging fluke-like members pivotally mounted on said framework and movable between a retracted position close to said framework and a position in which said fluke-like members are extended from said framework, trigger means for locking said fluke-like members in retracted position, and operating means interconnecting said cable-engaging means and said trigger means, said operating means unlocking said trigger means in response to movement of said cable engaging means by a submarine cable engaged thereby for permitting movement of said fluke-like members to a sea-bed engaging position.

10. A submarine cable grapnel comprising in combination a framework, at least two outwardly extending cable prongs fixedly mounted on said framework, cable engaging means movably mounted upon said framework adjacent the roots of said prongs, a shaft mounted in said framework for longitudinal movement with respect to the latter, trigger means mounted on said framework for locking said shaft against movement, a plurality of sea-bed engaging fluke-like members pivotally mounted on said framework and movable between a retracted position close to said framework and positions in which said members are extended from said framework, levers interconnecting each of said members with said shaft so that on longitudinal movement of the latter movement of said members from one position to the other is effected, and operating means interconnecting said cable engaging means and said trigger, said operating means unlocking said trigger means in response to movement of said cable engaging means by a submarine cable engaged thereby for permitting movement of said fluke-like members to a sea-bed engaging position.

11. A submarine cable grapnel comprising in combination a framework, at least two outwardly extending cable prongs fixedly mounted on said framework, cable engaging means movably mounted upon said framework adjacent the roots of said prongs, a shaft mounted in said framework for longitudinal movement with respect to the latter, an abutment on said shaft, a collar mounted on said shaft, a shear pin interconnecting said collar with said shaft, a series of levers pivotally mounted upon said framework and each in engagement with said abutment and said collar, said cable engaging means resting on said collar, a plurality of sea-bed engaging fluke-like members pivotally mounted on said framework and each movable between a retracted position close to said framework and positions in which said members are extended from said framework, and a linkage interconnecting said members with said shaft so that on longitudinal movement of the latter movement of said members from one position to the other is effected.

12. A submarine cable grapnel comprising in combination a framework, at least two outwardly extending cable prongs fixedly mounted on said framework, cable engaging means movably mounted on said framework adjacent the roots of said prongs, displaceable cable catches mounted on said framework adjacent said engaging means to trap a cable after engagement with one of said engaging means, a plurality of sea-bed engaging fluke-like members pivotally mounted on said framework and movable between a retracted position close to said framework and a position in which said fluke-like members are extended from said framework, trigger means for locking said fluke-like members in retracted position, and operating means interconnecting said cable-engaging means and said trigger means said operating means unlocking said trigger means in response to movement of said cable engaging means by a submarine cable engaged thereby for permitting movement of said fluke-like members to a sea-bed engaging position.

13. A submarine cable grapnel comprising in combination a framework, at least two outwardly extending cable prongs fixedly mounted on said framework, cable engaging means movably mounted upon said framework adjacent the roots of said prongs, a shaft mounted in said framework for longitudinal movement with respect to the latter, an abutment on said shaft, a series of levers pivotally mounted upon said framework and each in engagement with said abutment, and operating means for holding said levers in engagement with said abutment, said operating means being responsive to movement of any one of said bale engaging means for releasing said levers from engagement with said abutment.

References Cited in the file of this patent

UNITED STATES PATENTS

| 890,499 | Clough | June 9, 1908 |

FOREIGN PATENTS

| 791,130 | Great Britain | Feb. 26, 1958 |